United States Patent Office 3,651,105
Patented Mar. 21, 1972

3,651,105
CHROMIUM COMPLEXES OF FLUOROISO-
ALKOXYALKYL CARBOXYLIC ACIDS
Louis G. Anello, Basking Ridge, Edward Michael
Boghosian, Fort Lee, Edward S. Jones, Whippany,
Pritam S. Minhas, Morris Plains, Alson K. Price, Morristown, and Richard F. Sweeney, Randolph Township,
Dover, N.J., assignors to Allied Chemical Corporation,
New York, N.Y.
No Drawing. Filed Nov. 1, 1968, Ser. No. 772,849
Int. Cl. C08h 17/36
U.S. Cl. 260—414  7 Claims

ABSTRACT OF THE DISCLOSURE

Chromium complexes of fluorocarbon carboxylic acids characterized by having a polyfluoroisoalkoxyalkyl tail wherein an ether oxygen atom links a fluorinated carbon atom connected to two fluoroalkyl groups and at least one —$CF_2CF_2$-group. These chromium complexes are useful to impart oil and water resistance to various substrates, including paper, leather, and the like.

---

This invention relates to novel chromium complexes of fluorocarbon carboxylic acids which are useful for treating a wide variety of substrates to impart oil and water resistance thereto. More particularly, this invention relates to chromium complexes of fluorocarbon carboxylic acids having a polyfluoroisoalkoxyalkyl tail, wherein an ether oxygen atom links a fluorinated carbon atom attached to two fluoroalkyl groups and a —$CF_2$—$CF_2$-group The fluorocarbon carboxylic acids used in making the chromium complexes of the invention have the formula:

(1) 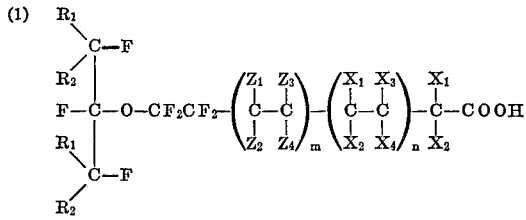

wherein $R_1$ and $R_2$ independently can be fluorine, chlorine, perfluoroalkyl or together can form a cyclic perfluoroalkylene group with the proviso that both $R_1$ and $R_2$ are not chlorine; $Z_1$, $Z_2$, $Z_3$, and $Z_4$ are independently selected from the group consisting of hydrogen, fluorine and chlorine, providing the sum of $Z_1$–$Z_4$ contains no more than 2 chlorine atoms; $X_1$, $X_2$, $X_3$ and $X_4$ are independently selected from the group consisting of hydrogen, fluorine and chlorine providing that no more than one of $X_1$–$X_4$ is chlorine, and $X_3$ cannot be hydrogen when $X_4$ is halogen; and $m$ and $n$ are integers of 0–75 and the sum of $m$ and $n$ is from 0–75. Preferably, $m$ and $n$ are integers from 0 to 10.

The criticality in the structure of the above-described acids is in the polyfluoroalkoxyalkyl tail portion of the molecule wherein an ether oxygen atom links a fluorinated carbon atom attached to two fluoroalkyl groups and a —$CF_2CF_2$-group.

The above-described acids can be prepared from their corresponding polyhaloisoalkoxyalkyl iodides. The iodides. The iodides and their preparation are disclosed in detail in copending U.S. application Ser. No. 633,359, filed Apr. 25, 1967, now U.S. Pat. No. 3,514,487. These telomers are prepared by reacting polyhaloisoalkoxyalkyl iodides of the formula:

(2) 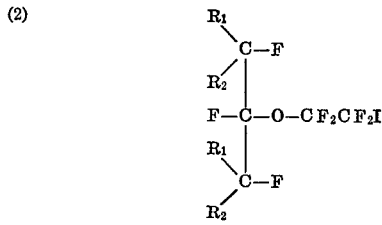

wherein $R_1$ and $R_2$ have the meanings given above, with telomerizable unsaturated compounds having the formula $Z_1Z_2C$=$CZ_3Z_4$ and/or $X_1X_2C$=$CX_3X_4$ wherein $Z_1$–$X_4$ and $X_1$–$X_4$ have the meanings given above. Suitable telomerizable compounds include ethylene, tetrafluoroethylene, difluoroethylene, chlorodifluoroethylene, and the like. The telomerization reaction can be initiated by heat or by a free radical initiator.

The polyhaloisoalkoxyalkyl iodides can be prepared by reacting a suitable halogenated ketone with an ionizable fluoride salt, e.g. CsF or KF, to form a fluorinated organic salt, and reacting the organic salt with tetrafluoroethylene and iodine. Preparation of the polyhaloisoalkoxyalkyl iodides is described in detail in copending U.S. applications of Litt et al., Ser. Nos. 492,276 filed Oct. 1, 1965, now U.S. Pat. No. 3,453,333 and 513,574 filed Dec. 13, 1965, now U.S. Pat. No. 3,470,256. The pertinent subject matter of these copending applications is hereby incorporated by reference.

The following series of equations will serve to further illustrate the preparation of the iodides, wherein $R_1$, $R_2$, $Z_1$–$Z_4$, $X_1$–$X_4$, $m$ and $n$ have the meanings given above.

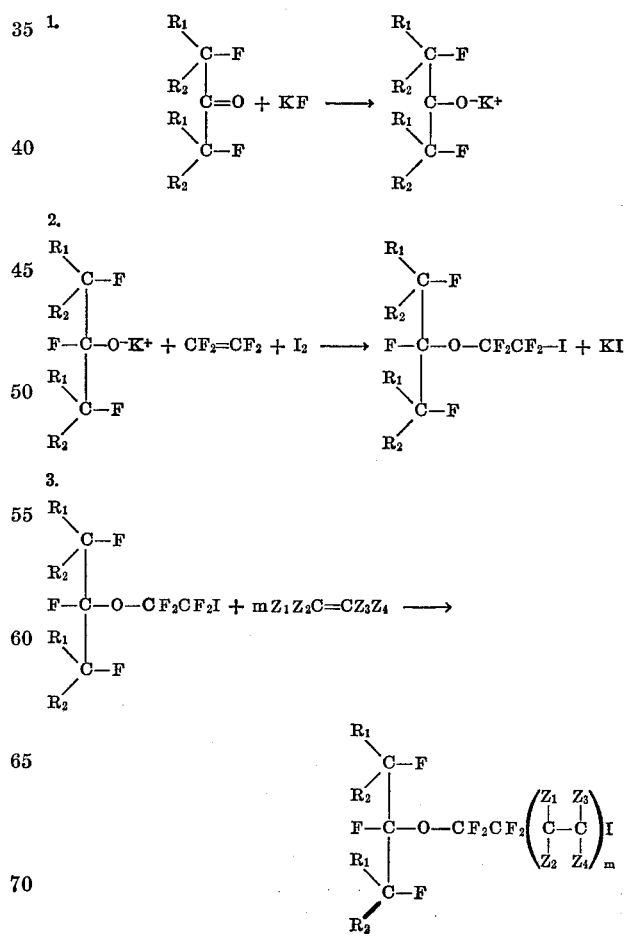

4.

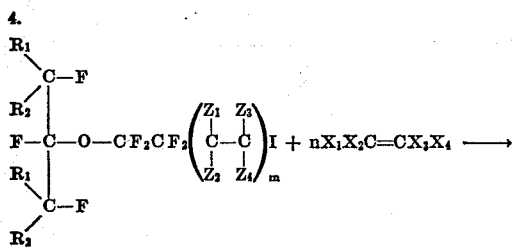

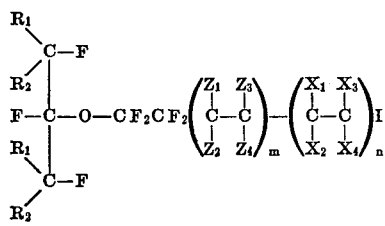

It will be understood that when m and/or n is 0, the applicable telomerization Equations 3 and/or 4 are omitted.

The fluorocarbon carboxylic acids described above can be prepared from the telomer iodides according to several routes.

Referring to the general Formula 1 the fluorocarbon carboxylic acids wherein $n$ is at least 1 and wherein $X_3$ and $X_4$ are both hydrogen can be prepared by reacting the appropriate iodide with $SO_3$ to form the corresponding pyrosulfate, or with oleum to form the corresponding hydrosulfate. The pyrosulfate or hydrosulfate can be hydrolyzed with aqueous acid to form the alcohol. The alcohol can be oxidized with well-known oxidizing agents such as potassium dichromate, potassium permanganate or concentrated nitric acid to form the free acid. The preparation of the alcohols is described in greater detail in a copending U.S. application of Anello et al., U.S. Ser. No. 721,089 filed Apr. 12, 1968, now abandoned. The pertinent subject matter of that application is hereby incorporated by reference.

Fluorocarbon carboxylic acids of the general Formula 1 wherein $n=0$ and $X_1$ and $X_2$ are hydrogen, fluorine or chlorine providing only one of $X_1$ and $X_2$ are either chlorine or hydrogen, can be prepared by oxidizing the alcohol derived from telomer iodides as in Equation 4 wherein $n=1$ and $X_3$ and $X_4$ are both hydrogen.

Fluorocarbon carboxylic acids of the general Formula 1 wherein $n=0$ and $X_1$ and $X_2$ are both hydrogen, and the carbon atom in the β-position with respect to the carboxyl group is substituted with two fluorine atoms, can be prepared by oxidation of a fluoroolefin containing a terminal ethylene group having the formula:

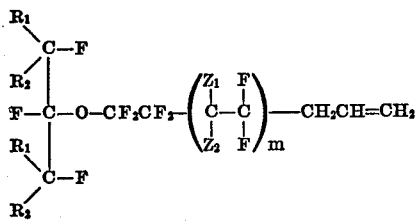

wherein $R_1$, $R_2$, $Z_1$, $Z_2$ and $m$ have the meanings given above. These fluoroolefins can be prepared by reacting the corresponding telomer iodides with allyl alcohol at a temperature between about 100° to 450° C., preferably between about 150° to 300° C., under superatmospheric pressure. The terminal ethylene group can be oxidized by treating with potassium permanganate or potassium dichromate as will be known to one skilled in the art.

Fluorocarbon carboxylic acids of the general Formula 1 wherein $n=1-75$ and $X_1-X_4$ are fluorine, can be prepared by reacting the telomer iodides with sulfur trioxide to form the corresponding acid fluoride and pyrosulfuryl fluoride at a temperature between about 50°–175° C., preferably about 100°–150° C. At least one mol of sulfur trioxide is employed per mol of telomer iodide; preferably an excess of about 2:1 to about 10:1 is employed. If required to maintain the reactants in liquid phase, superatmospheric pressure is employed, suitably 25–500 p.s.i.g. Higher molecular weight telomer iodides in general require longer reaction time and higher reaction temperatures for complete conversion. The product is generally a mixture of the acid fluoride, pyrosulfuryl fluoride, unreacted starting material and small amounts of the free acid. The products can be recovered from the mixture by fractional distillation. The acid fluoride and pyrosulfuryl fluoride can be hydrolyzed to the desired free acid by refluxing with water. Alternatively, the corresponding acid salts can be made by reaction with sodium or potassium hydroxide and acidification with an aqueous mineral acid.

The preparation of the acid starting materials is described in greater detail in copending U.S. application of Anello et al., Ser. No. 721,117 filed Apr. 12, 1968. Other methods of preparing the fluorocarbon acids will be known to one skilled in the art.

According to the preferred embodiment of the invention, chromium complexes of acids having the formula

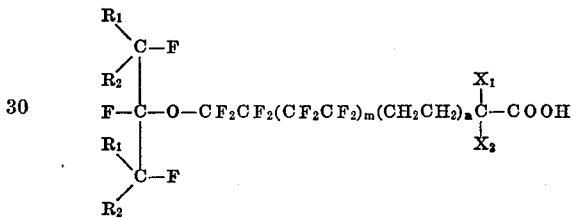

wherein $R_1$ and $R_2$ are fluorine or perfluoroalkyl of 1–2 carbon atoms, and $m$ and $n$ are integers from 0–10; $X_1$ and $X_2$ are hydrogen when $n$ is 1 or more; and $X_1$ and $X_2$ are fluorine when $n$ is 0, are particularly effective as sizing compounds for paper and as leather treating agents.

The chromium complexes of the fluorocarbon carboxylic acids described above are Werner-type coordination complexes. They are prepared in known manner by reacting a suitable acid as hereinbefore described with chromyl chloride in an anhydrous solvent in the presence of a reducing agent.

Other methods of preparing the chromium complexes will be known to one skilled in the art.

The molar ratio of the acid to chromyl chloride is not critical and can vary over a wide range, but generally from about 2 to about 20 mols of chromyl chloride per mol of acid is employed.

The reducing agents preferred are alcohols, which can also be used as the solvent for the reaction. Suitable alcohols include aliphatic alcohols such as methanol, ethanol, propanol, isopropanol, butanol, isopentanol, and the like. Excellent results are obtained with isopropanol. In addition to an alcohol solvent, other inert, anhydrous solvents can be employed including haloalkanes such as chloroform, carbon tetrachloride, sym-dichloroethane and the like. The presence of an inert solvent is advantageous in avoiding excessive reaction temperatures since the reaction between the acid and chromyl chloride is exothermic. In a preferred mode of operation, the chromyl chloride is dissolved in an inert solvent such as carbon tetrachloride and this solution is added slowly to the acid solution, maintaining the temperature at or below the reflux temperature of the reaction mixture.

The resultant green solution contains the chromium complex of the acid. The chromium complexes can be isolated as a green solid but preferably are used directly from the solvent in which they are prepared. The alcoholic solution can be employed as is, diluted further with alcohol or acetone, or part of the solvent can be evaporated by known means to obtain a concentrated stock solution. A small amount of water is advantageously added to the stock solution to stabilize it and prevent precipitation of the solid complex upon standing.

The chromium complexes of the invention are useful to impart oil and water resistance to a variety of substrates, including paper, cellulosic films, wood, leather, textile fibers, yarns and fabrics, ceramic products, metals such as aluminum, rubber, glass and the like. The resultant articles have excellent oil and water repellency.

The chromium complexes of the invention also impart release properties to a variety of substrates, including paper, rubbers, plastics, metal, glass and the like. They are particularly effective as release agents for paper. They can be applied as a coating from about 0.5 to about 3.0% by weight solutions in water to coated or uncoated papers, kraft papers, glassine and the like.

Dilute aqueous solutions, containing from about 0.01 to about 10% by weight of the chromium complex, are particularly effective as sizes for paper. Papers coated with a small amount of the chromium complexes of the invention show excellent water and ink resistance, and superior oil repellency. The treated papers are outstanding for use as protective packaging materials, and the like.

The invention will be further illustrated by the following examples, but it is to be understood that the invention is not meant to be limited to the details disclosed therein. In the examples, all parts and percentages are by weight, unless otherwise noted.

In the examples, the water repellency of treated papers is determined according to standard test T441-os-63 of the Technical Association of the Pulp and Paper Industry (Cobb Test). This test determines the amount of water absorbed by the paper after two minutes. A value of 20–25 or lower indicates excellent water resistance.

The oil resistance of treated papers is determined by the Kit test as follows: A kit of 12 solutions of varying proportions of castor oil, toluene and heptane is prepared, as set forth in the following table. A value of 12 shows superior oil repellency.

| Kit No. | Parts by volume | | |
|---|---|---|---|
| | Castor oil | Toluene | Heptane |
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The Kit value is the highest numbered solution that will stand on the surface to be tested in the form of a drop for 15 seconds, with no penetration of the solution, noted by any darkening of the area under the drop.

The ink resistance of treated papers is determined by the ink flotation test according to the following procedure: a 1.5 inch square of treated paper is folded to turn up all the edges. The square is floated on standard writing ink. The time in seconds required for the ink to penetrate evenly to the upper surface of the paper is noted as the ink penetration. A time of 900 seconds or longer denotes excellent ink resistance.

Leather is tested for oil, water, and chemical repellency according to the following tests:

Static water absorption is determined by immersing a 2" x 2" piece of the leather to be tested in water to a depth of one inch for one hour. The specimen can be kept below the surface by weighted hooks or by hooks held to a magnet. The surface water is blotted off, and the sample is reweighed. The water absorption is determined according to the following equation:

$$\text{Percent water abs.} = 100 \times \frac{W_2 - W_1}{W_1}$$

The spray rating is determined according to ASTM test D 583–54.

The oil repellency rating is determined by placing drops of mixtures of mineral oil and n-heptane on the leather. The composition containing the highest percentage of n-heptane which does not wet the leather under the drop is the oil repellency rating. The scale used is given below:

| Oil repellency rating | Percent n-heptane |
|---|---|
| 100 | 50 |
| 90 | 40 |
| 80 | 30 |
| 70 | 20 |
| 60 | 10 |
| 50 | 0 |
| 0 | (no holdout to oil) |

The static oil absorption is determined in similar manner to the water absorption test except that the leather is immersed in oil to a depth of ¼ inch, and the piece is removed after 10 minutes.

Resistance to hydrochloric acid is determined by placing a 4" x ½" sample of the leather to be tested on a smooth horizontal surface and weighting one end for one inch. 37% hydrochloric acid is applied along a strip ⅛" x ¼" of the remaining portion 1½" from the unweighted end. The amount of rise or curl of the leather after 5 minutes is measured in degrees.

Caustic resistance is determined by applying 5 drops of 10 M NaOH preheated to 100° C. to the surface. After 5 minutes, the leather is rinsed and dried. The area under the NaOH drops is examined and reported as: no effect, slight stain, slight burn, severe burn or hole.

The leather employed in the tests is first chrome tanned, retanned with vegetable extracts or syntans, colored and fat liquored according to conventional procedures for tanning and dyeing leathers.

EXAMPLE 1

512 parts of 4 - heptafluoroisopropoxyoctafluorobutyl iodide $(CF_3)_2CFOCF_2CF_2CF_2CF_2I$, 6.02 parts of 3-butenoic acid and 3.3 parts of azobisisobutyronitrile were charged to a vessel fitted with a stirrer, thermometer and condenser and heated at 80–100° C. for 5 hours. The unreacted ether iodide was distilled off.

The product was dissolved in 400 parts of ethanol, heated to 65° C. and saturated with hydrogen chloride gas. 60 parts of zinc dust were added portionwise. After refluxing for three hours, the mixture was poured into water. The organic layer was washed with water, dried and distilled.

A 58% yield of 8-heptafluoroisopropoxy-5,5,6,6,7,7,8,8-octafluorooctanoic acid having the formula $$(CF_3)_2CFO(CF_2CF_2)_2(CH_2)_3COOH$$

and a boiling point of 140–143° C./10 mm. was obtained. A 17% yield of the corresponding ethyl ester was also obtained having a boiling point of 106–108° C./10 mm.

4.0 parts of the acid were dissolved in 50 parts by volume of isopropanol. A solution containing 2.63 parts of chromyl chloride in 50 parts by volume of carbon tetrachloride was added dropwise, maintaining the mixture at reflux. 75 parts by volume of solvent was distilled off and the mixture diluted to 50 parts by volume with isopropanol.

The solution was diluted with water to contain 0.48% of chromium complex solids. This solution imparts oil and water resistance to paper.

EXAMPLE 2

An acid of the formula

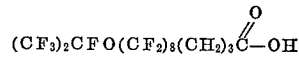

was prepared following the procedure given in Example 1 except that di-t-butyl peroxide was used as catalyst and the corresponding telomer iodide and 3-butenoic acid were heated at 130–145° C. for 8 hours.

The acid obtained had a melting point of 92–95° C.

2.0 parts of the acid as described above were dissolved in 100 parts by volume of isopropanol and 0.93 part of chromyl chloride in 50 parts by volume of carbon tetrachloride was added dropwise maintaining the mixture at reflux. 130 parts by volume were distilled off and the mixture diluted to 30 parts by volume with isopropanol.

A portion of the solution is evaporated. A green, solid chromium complex is obtained.

The product solution was diluted with water. Paper handsheets were treated with the solution and tested for oil and water repellency according to the tests described above. The data is given below:

| Percent chromium complex applied | Kit No. | Cobb size |
| --- | --- | --- |
| 0.77 | 10 | 24 |
| 0.35 | 7 | 22 |

EXAMPLE 3

72 parts of $(CF_3)_2CFO(CF_2CF_2)_6I$ and 37 parts of liquid sulfur trioxide were charged to a reaction vessel fitted with a pressure gauge and stirrer and connected to a Dry Ice/acetone trap. The vessel was flushed with nitrogen, sealed and heated at 124–126° C. for 17 hours. The mixture was cooled to room temperature. The organic layer was collected and distilled. 5 parts of $(CF_3)_2CFO(CF_2CF_2)_5CF_2COF$ and 6 parts of $(CF_3)_2CFO(CF_2CF_2)_6OSO_2OSO_2F$ were recovered.

7 parts of the pyrosulfuryl fluoride product prepared as above were charged to a vessel and 25 parts of sodium hydroxide added slowly as a 25% aqueous solution. The temperature rose to 45–50° C. The mixture was left standing for one hour and then acidified with concentrated sulfuric acid. The layers were separated and the aqueous layer washed with ether. The ether washings were added to the organic layer which was dried over sodium sulfate and distilled.

4 parts of $(CF_3)_2CFO(CF_2CF_2)_5CF_2COOH$ were recovered. The structure was confirmed by infrared analysis.

5.0 parts of the acid prepared above and 34 parts of isopropanol were charged to a vessel. 3.0 parts of chromyl chloride in 10 parts by volume of carbon tetrachloride were added dropwise while stirring and maintaining the temperature below about 35° C. 0.5 part of water and 11.5 parts of isopropanol were added to make 70 parts of the solution. The resultant solution contained about 11.5% of the chromium complex.

EXAMPLE 4

Unsized weighed paper sheets were dipped into solution prepared from the chromium complex of Example 3 dilute with water to various concentrations. The sheets were blotted dry and reweighed to determine the amount of pickup. The sheets were tested for water and oil repellency. The results are given below:

| Percent chromium complex applied | Kit No. | Cobb size | Ink flotation |
| --- | --- | --- | --- |
| 0.5 | 12 | 19.2 | 900+ |
| 0.25 | 11 | 24.0 | 900+ |
| 0.13 | 5 | 22.4 | 900+ |
| 0.06 | 4 | 53.2 | 15 |

EXAMPLE 5

20 grams of pigskin were treated with an aqueous solution of the chromium complex of Example 3 at 40–50° C. for 3 hours. The treated pigskin was rinsed, pulled and dried. 3.0 grams of chromium complex had been applied.

The treated pigskin was tested for oil, chemical and water repellency. The results are given below:

Static water absorption, percent: 58.5
Spray rating: 100
Static oil absorption, percent: 58.5
Oil repellency rating: 120—
HCl resistance: no curl
Caustic resistance: very slight stain

EXAMPLES 6–14

Chromium complexes of additional fluorocarbon acids are prepared according to procedures described hereinabove and are effective oil and water repellency agents. The structural formulas of the fluorocarbon acids are set forth below:

EXAMPLE 6

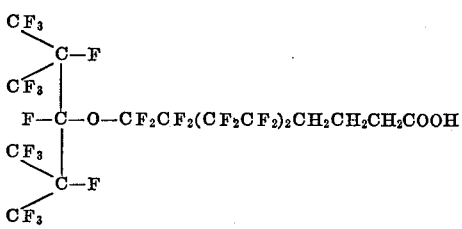

EXAMPLE 7

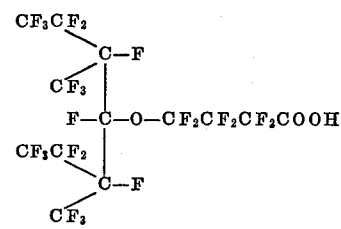

EXAMPLE 8

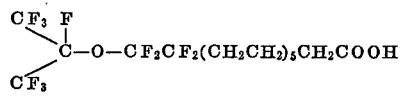

EXAMPLE 9

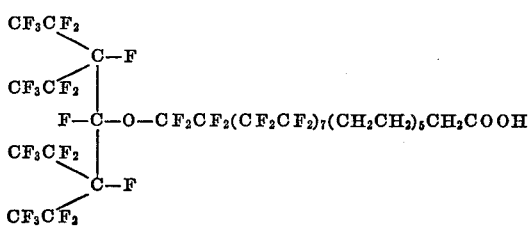

Example 10

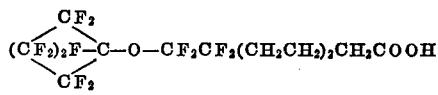

Example 11

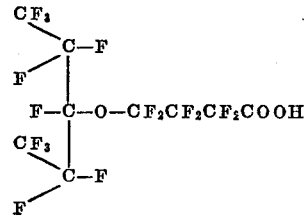

Example 12

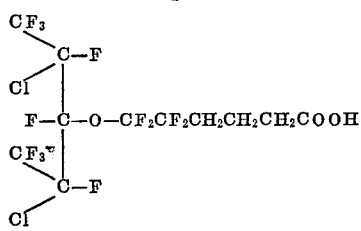

Example 13

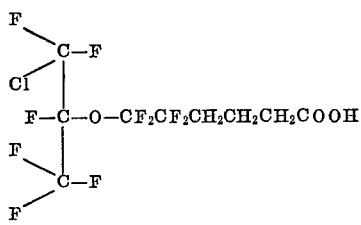

Example 14

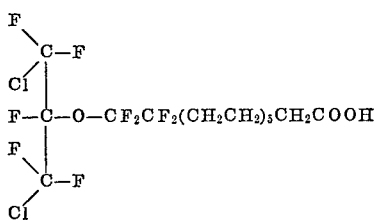

It will be apparent that numerous modifications and variations may be effected without departing from the novel concepts of the present invention, and the illustrative details disclosed are not to be construed as imposing undue limitations on the invention.

We claim:

1. Chromium complexes of a fluorocarbon carboxylic acid of the formula:

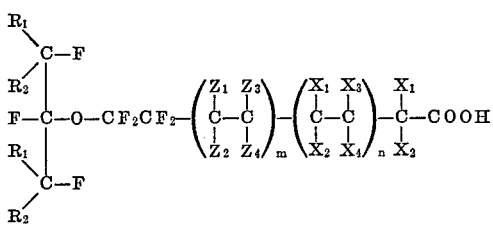

wherein $R_1$ and $R_2$ independently at each occurrence can be fluorine, chlorine, perfluoroalkyl and can be joined to form a cyclic perfluoroalkylene group, with the proviso that at least one of $R_1$ and $R_2$ is fluorine when the other is chlorine; $Z_1$, $Z_2$, $Z_3$ and $Z_4$ are independently selected from the group consisting of hydrogen, fluorine and chlorine, with the proviso that no more than two of $Z_1$-$Z_4$ are chlorine; $X_1$, $X_2$, $X_3$ and $X_4$ are independently selected from the group consisting of hydrogen, chlorine and fluorine, with the proviso that no more than one of $X_1$-$X_4$ is chlorine and $X_3$ cannot be hydrogen when $X_4$ is halogen; $m$ and $n$ are integers from 0–75; and the sum of $m$ and $n$ is from 0–75.

2. Chromium complexes according to claim 1 wherein $m$ and $n$ are integers from 0–10.

3. Chromium complexes according to claim 1 wherein said acid has the formula:

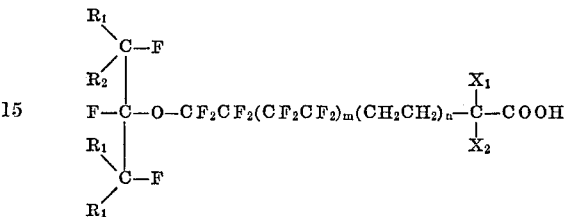

wherein $R_1$ and $R_2$ are fluorine or perfluoroalkyl of 1–2 carbon atoms, $m$ and $n$ are integers from 0–10; $X_1$ and $X_2$ are fluorine when $n=0$; and $X_1$ and $X_2$ are hydrogen when $n=1$ or more.

4. Chromium complexes according to claim 3 wherein $R_1$ and $R_2$ at each occurrence are fluorine.

5. Chromium complexes of an acid having the formula

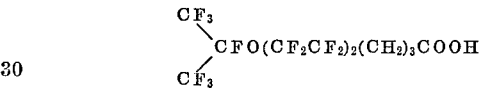

6. Chromium complexes of an acid having the formula

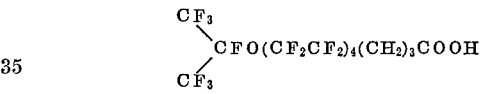

7. Chromium complexes of an acid having the formula

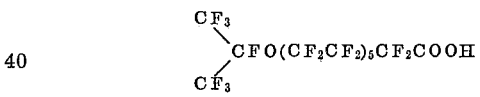

References Cited

UNITED STATES PATENTS

| | | | |
|---|---|---|---|
| 2,693,458 | 11/1954 | Olson | 260—2 |
| 2,713,593 | 7/1955 | Brice et al. | 260—535 |
| 3,409,647 | 11/1968 | Pittman et al. | 260—408 |
| 3,453,333 | 7/1969 | Litt et al. | 260—414 |
| 3,088,958 | 5/1963 | Eleuterio | 260—438 |

LEWIS GOTTS, Primary Examiner

E. G. LOVE, Assistant Examiner

U.S. Cl. X.R.

106—2; 117—135.5; 252—8.57; 162—179; 260—438.5

UNITED STATES PATENT OFFICE
CERTIFICATE OF CORRECTION

Patent No. 3,651,105  Dated March 21, 1972

Inventor(s) L.G. Anello, E.M. Boghosian, E.S. Jones, R.F. Sweeney, P.S. Minhas and A.K. Price It is certified that error appears in the above-identified patent and that said Letters Patent are hereby corrected as shown below:

Col. 1, line 67   delete "The 1o-";

Col. 1, line 68   delete "dides.";

Col. 2, line 13   "$Z_1-X_4$" should be -- $Z_1-Z_4$ --;

Col. 2, 2nd. formula that part which reads

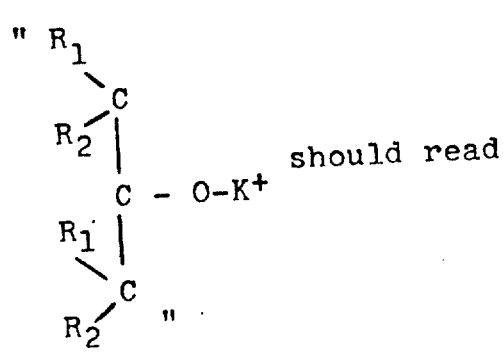  should read  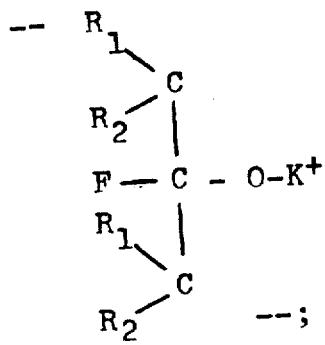 --;

Col. 6, line 41   "6.02" should be -- 60.2 --;

Col. 8, line 6   "58.5" should be -- 17.6 --;

Col. 10, 1st. formula that part which reads

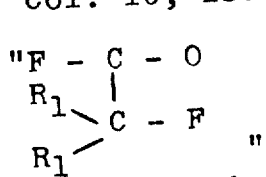  should read  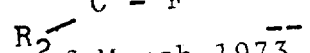 --

Signed and sealed this 27th day of March 1973.

(SEAL)
Attest:

EDWARD M. FLETCHER, JR.,
Attesting Officer

ROBERT GOTTSCHALK
Commissioner of Patents